(12) United States Patent
May

(10) Patent No.: US 9,759,802 B2
(45) Date of Patent: Sep. 12, 2017

(54) SYSTEM AND METHOD FOR DETERMINING GEO LOCATION OF A TARGET USING A CONE COORDINATE SYSTEM

(71) Applicant: RAYTHEON APPLIED SIGNAL TECHNOLOGY, INC., Waltham, MA (US)

(72) Inventor: William D. May, Ellicott City, MD (US)

(73) Assignee: RAYTHEON APPLIED SIGNAL TECHNOLOGY, INC., Sunnyvale, CA (US)

( * ) Notice: Subject to any disclaimer, the term of this patent is extended or adjusted under 35 U.S.C. 154(b) by 969 days.

(21) Appl. No.: 14/061,337

(22) Filed: Oct. 23, 2013

(65) Prior Publication Data

US 2016/0061932 A1    Mar. 3, 2016

Related U.S. Application Data

(60) Provisional application No. 61/881,905, filed on Sep. 24, 2013.

(51) Int. Cl.
*G01S 3/02* (2006.01)
*G01S 5/02* (2010.01)
(Continued)

(52) U.S. Cl.
CPC ............... *G01S 5/02* (2013.01); *G01S 5/06* (2013.01); *G01S 5/0257* (2013.01);
(Continued)

(58) Field of Classification Search
CPC . G01S 5/02; G01S 5/12; G01S 5/0257; G01S 5/0268; G01S 5/06
(Continued)

(56) References Cited

U.S. PATENT DOCUMENTS 3,922,533 A * 11/1975 Royal ....................... G01S 1/02
235/411
5,526,001 A * 6/1996 Rose ....................... G01S 1/026
342/442
(Continued)

OTHER PUBLICATIONS

Grabbe, et al., "Geo-Location Using Direction Finding Angles", Johns Hopkins APL Technical Digest, vol. 31, No. 3, 2013 (pp. 254-262).

*Primary Examiner* — Chuong P Nguyen
(74) *Attorney, Agent, or Firm* — Lewis Roca Rothgerber Christie LLP

(57) ABSTRACT

A method for determining geo-position of a target by an aircraft includes: receiving navigation data related to the aircraft including aircraft attitude information; receiving multilateration information related to the target including an angle to the target; calculating an axis for a cone fixed to the aircraft, based on the received aircraft attitude information; calculating a central angle for the cone from the received angle to the target; generating two vectors orthogonal to the cone axis; calculating a cone model from the axis, the central angle and the two vectors; and intersecting the cone model with an earth model to obtain a LEP curve, wherein the LEP curve is used to determine the geo position of the target.

12 Claims, 6 Drawing Sheets

(51) Int. Cl.
*G01S 5/06* (2006.01)
*G01S 5/12* (2006.01)
*G01S 5/04* (2006.01)

(52) U.S. Cl.
CPC .............. *G01S 5/0268* (2013.01); *G01S 5/04* (2013.01); *G01S 5/12* (2013.01)

(58) Field of Classification Search
USPC ................................ 342/450, 451, 386, 417
See application file for complete search history.

(56) References Cited

U.S. PATENT DOCUMENTS

| | | | |
|---|---|---|---|
| 7,292,180 B2 * | 11/2007 | Schober | G01S 3/48 342/146 |
| 7,498,976 B2 * | 3/2009 | Schober | G01S 3/48 342/146 |
| 7,551,138 B2 | 6/2009 | Grabbe | |
| 8,830,122 B2 * | 9/2014 | Menegozzi | G01S 3/48 342/357.25 |
| 9,383,429 B2 * | 7/2016 | May | G01S 5/12 |

* cited by examiner

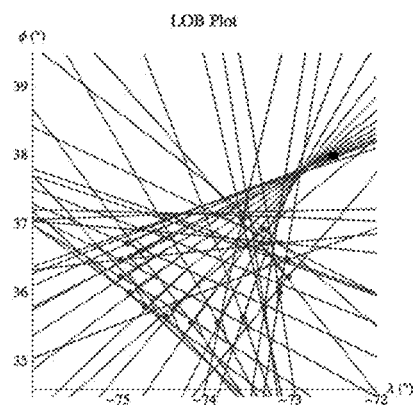 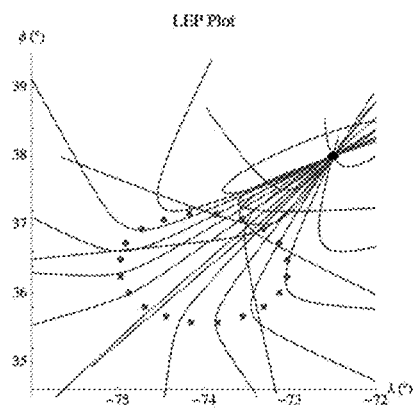
FIG. 1A  FIG. 1B
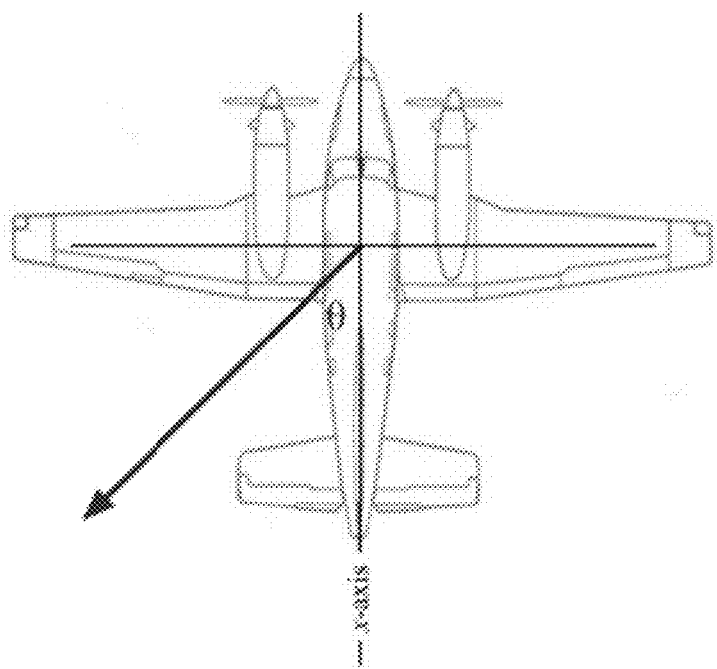
FIG. 2

SYSTEM AND METHOD FOR DETERMINING GEO LOCATION OF A TARGET USING A CONE COORDINATE SYSTEM

CROSS-REFERENCE TO RELATED APPLICATIONS

This patent application claims the benefits of U.S. Provisional Patent Application Ser. No. 61/881,905, filed on Sep. 24, 2013 and entitled "System And Method For Determining Locus Of Emitter Positions Using Cone Coordinates," the entire content of which is hereby expressly incorporated by reference.

FIELD OF THE INVENTION

The present invention relates to a system and method for determining geo location of a target using a cone coordinate system.

BACKGROUND

Multilateration is a navigation technique that utilizes measurement of the difference in distance to one or more emitters (stations) at known locations that broadcast signals at known times. However, this measurement of the difference in distance yields an infinite number of locations that satisfy the measurement. A hyperbolic curve is formed when these possible locations are plotted. A second measurement needs to be taken from a different pair of emitters (stations) to produce a second curve which intersects with the first curve and thus locate the exact location along the hyperbolic curve. When the two or more curves are compared, a small number of possible locations are identified to obtain a "fix". Multilateration is a common technique in radio navigation systems.

A line of bearing (LOB) measurement is based on a direction from a point to a target (emitter). An estimate of a target's location can be found by combining two different LOB measurements to obtain a fix. The segment between the two LOB sensors is referred to as the "baseline," and the distance to the target from the center of the baseline is the "standoff distance."

A relatively accurate measure of the physical relationship between the sensors and the target is the angle formed by the rays connecting the target to each sensor. For targets at ranges in excess of one baseline, the angle descriptor (which decreases) more accurately describes the off-boresight case than the range-to-baseline ratio (which does not decrease). However, measurement errors of the target location become increasingly substantial, when the angle formed by the line segments connecting the sensors to the target is small. For example, if the estimate of a target's location is performed by an airborne platform, such as an aircraft, the platform (aircraft) has to be in a straight and level flight for the estimate to be accurate. This imposes a significant limitation of the aircraft and the environment, in which the target position is to be determined.

The shortcomings of the LOB algorithm have been somewhat addressed by using measurements made only during straight and level flight and a fixed standoff from the target. When fixes are calculated using data obtained under these constraints, the geo-fix may have a sufficient accuracy. However, the drawbacks are that the aircraft maneuvering must be tightly controlled when a geo-location fix is being attempted, and that measurements are dropped if the constraints of straight and level flight (for example, during turns) and/or standoff distance are not satisfied.

These drawbacks restrict how and when a conventional standoff RF geo-location system can be used. A common operational scenario is that when a target is detected, an initial geo-fix is computed, and the operator points a camera toward the target. Putting a camera on the target often requires turning and flying the aircraft closer toward the target. When this happens the aircraft is no longer flying broadside to the emitter in straight and level flight, so LOB measurements begin to exhibit the spirograph pattern.

A recent development in airborne geo-location is the introduction of near vertical direction finding (NVDF) systems. Unlike standoff direction finding (DF) systems, an NVDF system is looking down (as the name implies) from an aircraft, not sideways. Since the aircraft is looking down, NVDF has a much smaller field of view than a standoff system. On the other hand, NVDF systems provide two angles of arrival, and can provide instantaneous position estimates. Instantaneous measurements enable an NVDF system to track moving emitters. Since the operation and capabilities of NVDF and conventional standoff are quite different, they complement, rather than replace, one another.

SUMMARY OF THE INVENTION

The present invention utilizes a locus of emitter positions (LEP) approach, which produces valid geo-location results using a cone coordinate system. The LEP curves are obtained from navigation data related to an aircraft and multilateration information related to a target. The LEP approach works correctly regardless of aircraft attitude and position relative to the target. The aircraft need not be flown at a fixed standoff from the target (the location of which is assumed to be unknown), and can be climbing, turning or banking. A geo-location engine according to the present invention can use all available data, not just the data acquired during periods when attitude and standoff constraints are satisfied.

In some embodiments, the present invention is a method performed by one or more processors for determining geo-position of a target by an aircraft. The method includes: receiving navigation data related to the aircraft including aircraft attitude information; receiving multilateration information related to the target including an angle to the target; calculating an axis for a cone fixed to the aircraft longitudinal axis, based on the received aircraft attitude information; calculating a central angle for the cone from the received angle to the target; generating two vectors orthogonal to the cone axis; calculating a cone model from the axis, the central angle and the two vectors; and intersecting the cone model with an earth model to obtain a locus of emitter positions (LEP) curve, wherein the LEP curve is used to determine the geo position of the target.

In some embodiments, the present invention is a system for determining geo position of a target by an aircraft. The system includes a receiver for receiving navigation data related to the aircraft and multilateration information related to the target, wherein the navigation data includes aircraft attitude information and the multilateration information includes an angle to the target; and one or more processors for calculating an axis for a cone fixed to the aircraft longitudinal axis, based on the received aircraft attitude information, calculating a central angle for the cone from the received angle to the target, generating two vectors orthogonal to the cone axis, calculating a cone model from the axis, the central angle and the two vectors, and intersecting the cone model with an earth model to obtain a LEP curve, wherein the LEP curve is used to determine the geo position of the target.

In some embodiments, the present invention is a method performed by one or more processors for determining geo position of a target by an aircraft. The method includes: (a). receiving navigation data related to the aircraft and multi-lateration information related to the target; (b). calculating a locus of emitter positions (LEP) curve from the received navigation data and multilateration information using a cone model fixed to the aircraft longitudinal axis and intersecting the cone model with a three-dimensional geometric model of the earth; (c). repeating steps (a) and (b); (d). accumulating, in a computer storage medium, the calculated LEP curves; and (e). electronically determining a position that is closest to all the accumulated LEP curves to establish a position of the target.

In some embodiments, the model of the earth may be a sphere or digital elevation data.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIGS. 1A and 1B illustrate two airborne radio geo-location determination methods.

FIG. 2 is a top view illustration of two-dimensional direction finding where an emitter is detected relative to an aircraft's longitudinal axis, according a conventional method.

DETAILED DESCRIPTION

Figure 3:
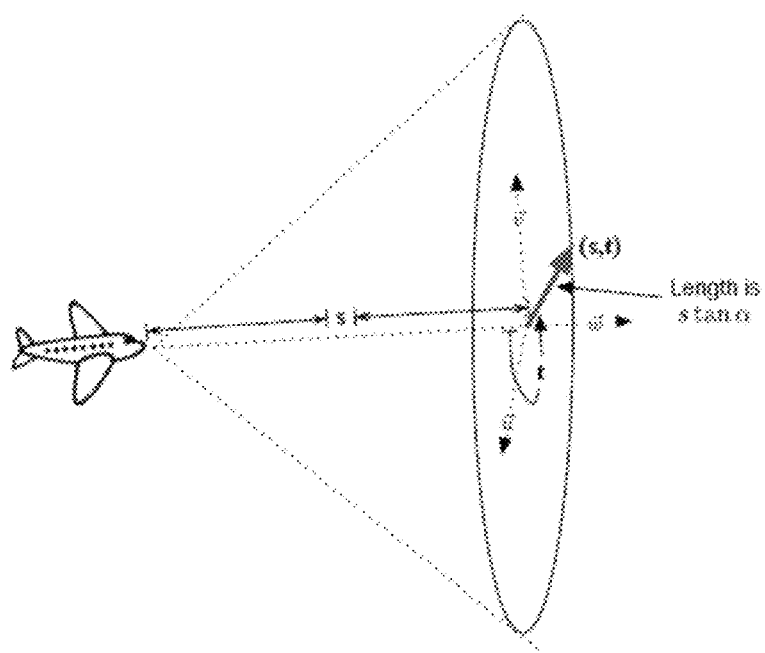
FIG. 3 is a top view illustration of a three-dimensional direction finding approach where an emitter is detected using a cone coordinate system relative to the aircraft longitudinal axis, according to some embodiments of the present invention.

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art. In some embodiments, the method of the present invention is executed by a geo-location engine, which includes one or more processors, memory, input/output logic and appropriate software and firmware, to transform measurements related to a target to an accurate geo-position of the target using a cone coordinate system.

In some embodiments, the present invention is a method performed by one or more processors for determining geo position of a target by an aircraft using cone coordinates. The present invention utilizes a more precise 3-D geometric model to improve the geo-fix accuracy. This new 3-D model takes into account the pitch and orientation of the airborne platform and does not require the airborne platform to be in a straight and level flight position when determining the position of the target.

FIGS. 1A and 1B illustrate two airborne radio geo-location methods. FIG. 1A depicts the traditional LOB-based approach and FIG. 1B shows the new locus of emitter positions (LEP)-based approach. The large black dot is the actual emitter location and the smaller dots are locations where the measurements are made. As shown, when the aircraft is not flying straight and level, the LOB approach produces a spirograph pattern that doesn't converge on the target. However, the LEP approach produces curves, rather than lines, that intersect precisely on the target location. The effects seen in these figures are due to geometry, not error. Throughout this analysis, all angle of arrival (AOA) measurements are assumed to be error free. Furthermore, it is assumed that there is no measurement noise. These figures illustrate the problem that motivates the LEP geo-location approach.

Even though there are no measurement errors, the LOB lines fail to cross at a single point. The effects of altitude and attitude of the aircraft combine to create a so-called "spirograph" pattern. With no crossing at a single point, it is impossible to form a valid geo-location fix. This is inherent to using an incorrect geometric model for geo-location from the air.

However, as shown in FIG. 1B, the LEP curves (not lines) intersect at the correct location of the emitter. While it can't be seen in FIG. 1B, the curves are in three dimensions, bending with the surface of the earth.

In the context of the present invention, the term "locus" refers to the set of points that satisfy some geometric condition. The "locus of emitter positions" is then the set of possible emitter locations given some geometric conditions. For airborne geo-location, these conditions are the angle of arrival measurement, the fact that the emitter is assumed to be on the ground, and aircraft position and attitude. If only the first condition is used, that is the angle of arrival measurement, the locus of emitter positions can be seen as a cone. The second condition, the fact that the emitter is on the surface of the earth, leads to intersecting the LEP cone with a sphere (or ellipsoid, or terrain data), that is a 3-D geometric model of the earth. The cone-surface intersection is a curve in three dimensions. The third condition, flight attitude, causes the intersection curve to undergo some complicated transformations.

FIG. 2 is a top view illustration of two-dimensional direction finding where an emitter is detected at θ° relative to the aircraft longitudinal axis (the x-axis), according to a conventional method. As shown, in a standoff direction finding system, a measurement comprises of an angle of arrival (AOA) and navigation data (position and heading). If the measurement is perfect, then it seems that one need only project the line onto the surface of the earth and extend the line to the radio horizon. The target emitter will be some-where on that line. This is the concept of a LOB approach, as applied in conventional geo-location systems. If, in fact, the measurement is made from the surface of the earth, then this geometric model is correct.

FIG. 3 is a top view illustration of a three-dimensional direction finding approach where an emitter is detected using a cone coordinate system relative to the aircraft longitudinal axis, according to some embodiments of the present invention. Here, the LEP algorithm is derived in a local coordinate system that is referred to as cone coordinates. As shown, the cone is defined by the aircraft location (which becomes the apex of the cone), the aircraft attitude (the vector $\vec{w}$) and the measured angle of arrival, $\alpha$. The convention used here is that $\alpha=0$ points toward the nose of the aircraft, while $\alpha=180$ points toward the tail. Coordinate axes are the vector $\vec{w}$; which extends the longitudinal axis of the aircraft, and the vectors $\vec{u}$ and $\vec{v}$; which are two vectors orthonormal to $\vec{w}$ and each other.

To determine the point in Cartesian space given by cone coordinates (s, t), first the distance s is moved along the $\vec{w}$ axis. Then, a unit vector anchored at that point is rotated by t radians around the $\vec{w}$ axis (i.e., in the $\vec{u}$-$\vec{v}$ plane). Finally, the rotated unit vector is multiplied by s tan $\alpha$ so that it reaches the surface of the cone. Accordingly, the cone surface is represented in parametric form:

$$P(s,t)=B+s(\vec{\delta}(t)+\vec{w}) \quad (1)$$

In this cone coordinate system, the location of a point on the surface of a cone is given as (s, t), where $s \in (-\omega, \omega)$ and $t \in (-\pi, \pi]$. The coordinate s is distance along the $\vec{w}$ axis and t is the rotation angle about $\vec{w}$. The radius of the cone at distance s along the axis is s tan $\alpha$, where s is the distance along the cone's axis $\vec{w}$, t is the angle around the axis, B is the cone vertex, and $\vec{\delta}(t)$ is the radius vector of the cone. That is, $$\vec{\delta}(t) = \tan \alpha (\vec{u} \cos t + \vec{v} \sin t) \quad (2)$$

This derivation takes place in homogeneous coordinates so that affine transformations are automatically incorporated. Homogeneous coordinates simplify computations in 3-dimensions, i.e. Equation (4) below is simpler.

Now let $$A = \begin{pmatrix} 1 & 0 & 0 & 0 \\ 0 & 1 & 0 & 0 \\ 0 & 0 & 1 & 0 \\ 0 & 0 & 0 & -1 \end{pmatrix} \quad (3)$$

Then, P'AP=0 is the locus of points distance 1 from the origin. Expanding and simplifying P'AP, the following equation is obtained:

$$\tfrac{1}{2}(2r^2+s^2+s(s \sec^2\alpha - 4r \sin\theta + \tan\alpha(4r \cos\theta \sin t + s \tan\alpha))-2)=0 \quad (4)$$

This equation relates s and t together and is referred as the "ST-Equation." Using the ST-Equation, one can solve for s in terms of t, or t in terms of s, and plug the result back into P(s, t). The first approach eliminates s to obtain a t parameterization; the second approach eliminates t to obtain an s parameterization. In either case, the result is a vector function of a single parameter, that is, a space curve, which is the (spherical) LEP.

In practical embodiments, the s parameterization is more useful. Since s corresponds to a "real world" measurement (distance), one can infer ranges of values for the parameter without any calculation.

According to Equation (4), s cannot be zero for positive r (r is aircraft altitude). The cone (Equation (1)) allows both negative and positive s, corresponding to a double cone. If $\alpha<\pi/2$ (angle of arrival is toward the nose), then only the cases in which s is >0 are interesting. Similarly, if $\alpha \geq \pi/2$ (angle of arrival is toward the tail) then, the cases in which s is <0 are interesting, because the cone extends back from the tail of the aircraft.

Furthermore, since the LEP is the earth-cone intersection and airborne geo-location is performed, the absolute value for s is bounded below by the aircraft altitude. One can also assume that s is no greater than the radio horizon. With very small computational effort, one is able to confine s to a single, finite positive or negative closed interval.

Essential singularities occur for sec $\alpha$ and tan $\alpha$ at $\alpha=\pi/2$ (the AOA is precisely broadside to the aircraft). For this value of $\alpha$, the ST-Equation is mathematically meaningless. Taking limits doesn't remove the singularity, so a derivation from scratch with $\alpha=\pi/2$ is necessary. The derivation is relatively simple and details are provided in the Appendix A, the entire contents of which is hereby expressly incorporated by reference. Calibration tables used to estimate AOA are built on a discrete set of points, so the exact value $\alpha=\pm\pi/2$ (90° or 270°) will occur if it appears in the table. A geo-location software implementation tests for this value and, when it occurs, it uses the separately derived LEP expressions.

It should be noted that although AOA and a 3-D cone geometric model is used to describe aspects of the present invention, the present invention is not limited to AOA and cone models. For example, other multilateration information, such as time difference of arrival (TDOA) information may be used to develop a three-dimensional geometric model. In the case of TDOA, the 3-D model is a three-dimensional hyperboloid model, instead of a 3-D cone model.

Although, the given examples mention that the AOA is measured relative to the longitudinal axis of the aircraft, it is also possible and within the scope of the present invention to measure the AOA relative to the wings of the aircraft, or a vertical axis.

Figure 4A:
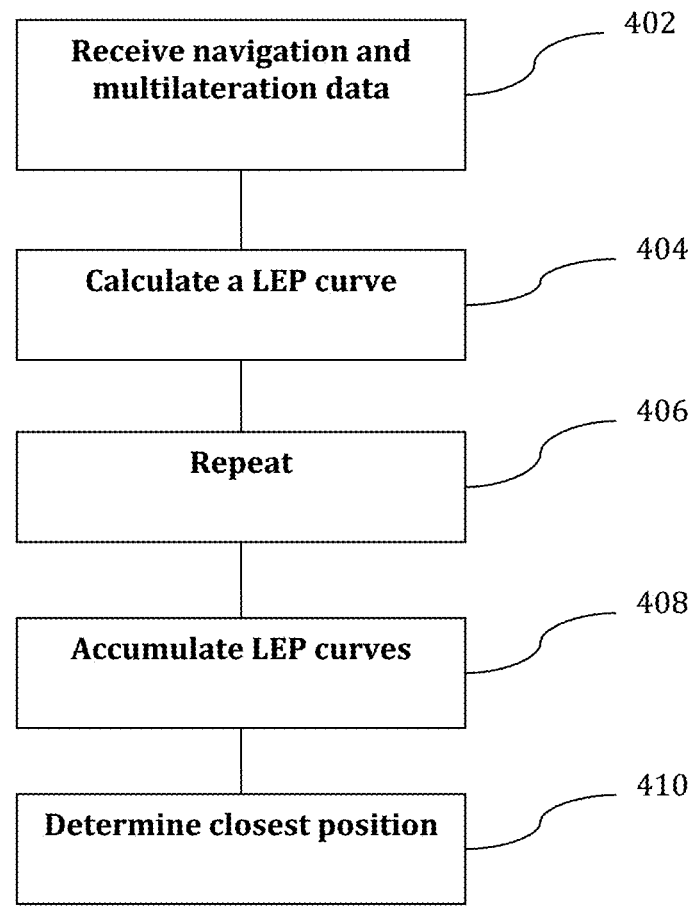
FIG. 4A is an exemplary process flow, executed by one or more processors, according to some embodiments of the present invention.

FIG. 4A is an exemplary process flow, executed by one or more processors, according to some embodiments of the present invention. As shown in block 402, navigation data related to the aircraft and multilateration information related to the target are received, for example by a receiver. The multilateration information may be in the form of AOA information, TDOA information, or the like. In block 404, the one or more processors (electronically) calculate an LEP curve from the received navigation data and multilateration information using a cone coordinate system described above, also shown in FIG. 3. The processes in blocks 402 and 404 are repeated, as the aircraft moves toward or away from the target (emitter). Then, the one or more processors electronically accumulate, in a computer storage medium, the calculated LEP curves, in block 406. Subsequently, the invention determines a position that is closest to all the accumulated LEP curves to establish a position of the target, in block 408.

According to some embodiments, the calculation of the LEP curve includes electronically converting the received multilateration information to a cone model (coordinate system), using the received navigation data; and electronically intersecting the three-dimensional geometric model with a three-dimensional geometric model of the earth to obtain the LEP curve. In the cases that the multilateration information is in the form of AOA information, the three-dimensional geometric model of the AOA information is a 3-D cone, and in the cases that the multilateration information is in the form of TDOA information, the three-dimensional geometric model of the AOA information is a 3-D hyperboloid.

Figure 4B:
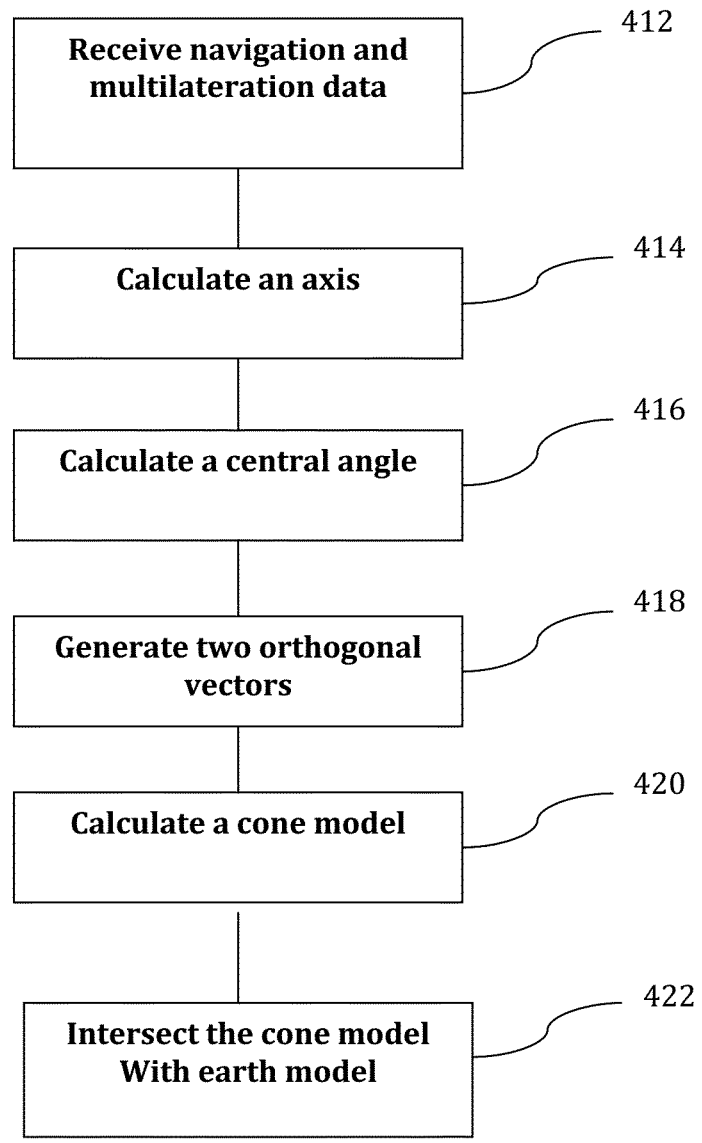
FIG. 4B is an exemplary process flow for obtaining the LEP curves using a cone coordinate system, executed by one or more processors, according to some embodiments of the present invention.

FIG. 4B is an exemplary process flow for obtaining the LEP curves using a cone coordinate system, executed by one or more processors, according to some embodiments of the present invention. As shown in block 412, navigation data related to the aircraft and multilateration information related to the target are received, for example by a receiver. In block 414, an axis for the cone model (coordinate system) is calculated from the multilateration information including aircraft attitude information. As shown in FIG. 3, the cone is fixed to the aircraft longitudinal axis and defined by the aircraft location (which becomes the apex of the cone), the aircraft attitude (the vector $\vec{w}$) and the measured angle of arrival, $\alpha$. A central angle is then calculated for the cone model from the received angle to the target, in block 416.

In block 418, two vectors that orthogonal to the cone axis are generated. These two vectors are defined with respect to FIG. 3, as and the vectors $\vec{u}$ and $\vec{v}$. Accordingly, the coordinate axes for the cone model are the $\vec{w}$ vector; which extends the longitudinal axis of the aircraft, and the vectors $\vec{u}$ and $\vec{v}$; which are two vectors orthonormal to $\vec{w}$ and each other. In block 420, a cone model is calculated from the axis, the central angle and the two vectors. That is, the cone model is defined by the aircraft location (which becomes the apex of the cone), the aircraft attitude (the vector $\vec{w}$) and the measured angle of arrival, $\alpha$. In block 422, the cone model is intersected with an earth model to obtain a locus of emitter positions (LEP) curve. This LEP curve is used to determine the geo position of the target.

In some embodiments, the processes in blocks 412 to 422 are repeated as the aircraft moves toward or away from the target to obtain a number of LEP curves, which are then accumulated in a computer memory. A position that is closest to all the accumulated LEP curves is then determined to establish the position of the target.

Figure 5:
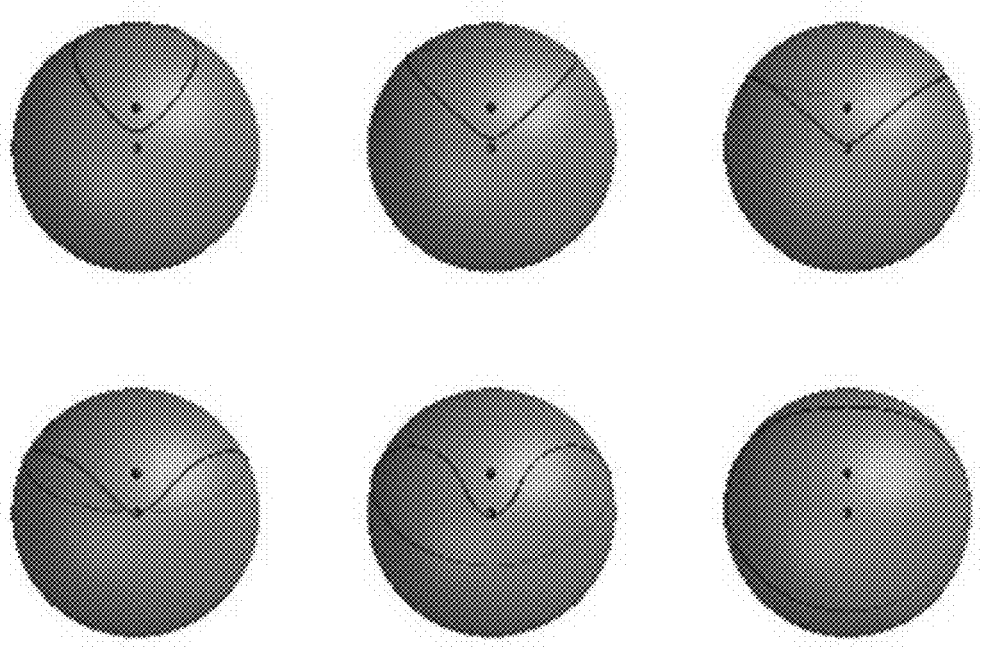
FIG. 5 depicts LEP points for a 45° AOA at pitch values increasing from 0° to 75° in 15° increments, according to some embodiments of the present invention.

FIG. 5 depicts LEP points for a 45° AOA at pitch values increasing from 0° to 75° in 15° increments, according to some embodiments of the present invention. Here, the aircraft is located at the dot and the sphere is slightly translucent so that the LEP points on the far side are visible. FIG. 5 shows how the LEP changes as the aircraft pitch varies from 0° to 75°. In this figure, the AOA is always 45°. An interesting phenomenon in this case is that the LEP can actually be two disjoint closed curves, one on the near side of the globe and one on the far side. For geo-location purposes, the only curves on the near side are considered. In order to see an LEP with two components the aircraft needs to be flying nearly vertical.

The geo location engine employs multiple LEP curves to determine what point lies closest to all those curves. An example is shown in FIG. 1B and is discussed above. As mentioned before, in calculations of FIG. 1B, there are no measurement errors so the LEP curves unambiguously intersect at a single point. However, in practice, the LEP curves do not intersect at a single point, so the geo-fix needs to be the point that is "closest" to all (or most) of the LEP curves.

Although there are many possibilities, two meanings of "closest" are most important to consider. The distance can be measured in three dimensions using the standard Euclidean (straight line distance) metric. This is the familiar square root of the sums of squares. There are two drawbacks to using the Euclidean metric. One is that the solution will not necessarily lie on the surface of the earth. In fact, it will almost never lie on the surface of the earth. The second drawback is that the optimization procedure is performed over a three dimensional space, which is much more complex.

A second distance measure is the well-known great circle distance measure. The great circle distance is taken between two points on the surface of the globe and is measured as the length of the shortest path along the surface of the globe between the two points. The generalization of great circle distance is known as geodesic distance. For general surfaces, calculation of a geodesic distance is quite difficult. However, for the sphere model (of the earth), there is a closed form expression. Using the great circle metric is computationally more expensive than the Euclidean metric. But, using this metric has the advantage that solutions always lie on the surface of the globe, and the optimization space is two dimensional (latitude and longitude), instead of three dimensional (x; y; z). The reduced search space for optimization tends to offset the greater complexity of the metric calculation. Both of the two above methods are applicable to the present invention.

In some embodiments, the LEP cone is positioned over latitude, longitude (0°; 0°) at normalized altitude r>1, i.e., the vertex of the cone is at $b_p=(r; 0; 0)$. The cone's axis is pointed due north, and tilted at angle $\theta$ in the x-z plane, so it can be represented by the vector $w_p=(-\sin\theta, 0; \cos\theta)$. The cone angle is a. To complete the 3D coordinate system we need two additional vectors: and east-west axis $u_p=(0,-,0)$ and $v_p=w_p \times u_p$, that is orthogonal to $w_p$ and $u_p$. The three vectors $w_p$, $u_p$, and $y_p$ form the axes of a right-handed coordinate frame. The function $$\delta(t,\alpha,\theta) = \tan\alpha(u_p\cos t + v_p), t \in (-\pi, \pi] \quad (4)$$

is parameterized in t, and describes a circle around the cone axis. Using the function $\delta(t,\alpha,\theta)$ a point on the surface of the cone is $$\text{ConePoint}(s,t,\alpha,\theta,r) = b_p + s(w_p + \delta(t,\alpha,\theta)), s \in [0,\infty), t \in (-\pi, \pi], \quad (5)$$

where the parameter s is distance along the cone axis, and t is an angle about the axis. Now, the intersection of the cone with the unit sphere is computed. This is the set of points with unit distance to the origin, so $$\text{ConePoint}(s,t,\alpha,\theta,r) \cdot \text{ConePoint}(s,t,\alpha,\theta,r) = 1,$$

where · is the vector dot product. The result, after some simplification, is $$(r+s(\tan\alpha\cos\theta\sin t - \sin\theta))^2 + s^2(\cos\theta + \tan\alpha\sin\theta\sin t)^2 + s^2\tan^2\alpha\cos^2 t - 1 = 0, \quad (6)$$

with s and t as in Equation (5).

Since the LEP is a space curve, it needs only a single parameter. Equation (6) is considered to be parameterized by s holding t constant, or parameterized by t holding s constant. Taking Equation (6) to be a function of s is the most useful Solving for t in Equation (6), and simplifying:

$$t = \begin{cases} \sin^{-1}\left(\dfrac{\cot\alpha\sec\theta(2rs\sin\theta - s^2\sec^2\alpha + 1 - r^2)}{2rs}\right) \\ \pi - \sin^{-1}\left(\dfrac{\cot\alpha\sec\theta(2rs\sin\theta - s^2\sec^2\alpha + 1 - r^2)}{2rs}\right) \end{cases}$$

With t as a function of s in the intersection we plug it into the equation for the cone, Equation (5), expand the expression and simplify to get the LEP parameterized in s:

$$\begin{pmatrix} x(s) \\ y(s) \\ z(s) \end{pmatrix} = \begin{pmatrix} \dfrac{r^2 - s^2\sec^2\alpha + 1}{2r} \\ -\tan\alpha\sqrt{1 - \dfrac{\cot^2\alpha\sec^2\theta(r^2 - 2rs\sin\theta + s^2\sec^2\alpha - 1)^2}{4r^2s^2}} \\ \dfrac{2rs\tan\theta - \tan\theta(r^2 - 2rs\sin\theta + s^2\sec^2\alpha - 1)}{2r} \end{pmatrix} \quad (7)$$

That is, the parameter s now corresponds to the distance along the axis of the cone, which is more tangible and less computationally intensive to calculate.

An LEP might have no points, only a single point or be a line rather than a closed curve. There are cases where LEPs are conics rather than 4'th order curves. We call these degenerate LEPs, and in practice we need to identify them. Usually they are ignored for geo-location purposes. The empty LEP condition is easily tested:

$$\cos(\theta + \alpha) > \frac{1}{r}. \quad (8)$$

Given an LEP, Equation (7), the valid range of values for s, i.e. the values of s that correspond to the cone-sphere intersection curve may be determined. That is, the range(s) of s where Equation (7) produces real, finite values. It is noted that x(s) and z(s) are always real values. The only possibility for the LEP to take complex values is for the argument of the square root function for y(s) to become negative. The values of s where the square root argument are zero are the critical values for the s. These values are found by solving for s:

$$s_{critical} = \begin{cases} \dfrac{\pm\sqrt{2}\sqrt{2\cos^2\alpha - r^2\cos^2\alpha\cos(2\alpha - 2\theta) - r^2\cos^2\alpha} - }{2} \\ \quad \dfrac{r\sin(2\alpha - \theta) + r\sin\theta}{2} \\ \dfrac{\pm\sqrt{2}\sqrt{2\cos^2\alpha - r^2\cos^2\alpha\cos(2\alpha + 2\theta) - r^2\cos^2\alpha} + }{2} \\ \quad \dfrac{r\sin(2\alpha + \theta) + r\sin\theta}{2} \end{cases} \quad (9)$$

Figure 6:
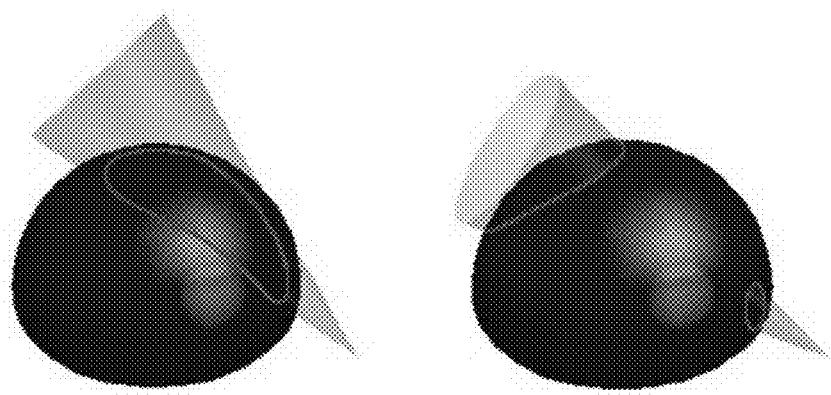
FIG. 6 shows two exemplary LEPs that include one or two connected components, depending on the aircraft pitch angle.

Given $\alpha$, $\theta$, and r we compute the four critical values of s. If there are no real values for $s_{critical}$ then the LEP is an empty set. If the LEP is non-empty, then there are two possibilities: there are either two or four real values for s, corresponding to whether there are one or two intervals where the LEP values are real. This corresponds to the fact that the LEP can be one or two connected curves, which in turn depends on how steeply pitched the aircraft is flying, as shown in FIG. 6. FIG. 6 shows two exemplary LEPs that include one or two connected components, depending on the aircraft pitch angle.

For the geo-location problem better fixes are obtained when using great circle distance, rather than Euclidean distance. This can be justified on physical principles, since radio waves generally propagate along the surface of the earth, not through the earth. The great circle distance calculation can performed efficiently in Cartesian coordinates:

$$|(x_0,y_0,z_0)-(x_1,y_1,z_1)|_{gc}=\cos^{-1}((x_0,y_0,z_0)\cdot(x_1,y_1,z_1)),$$

where $x_0^2+y_0^2+z_0^2=x_1^2+y_1^2+z_1^2=1$.

If the point of interest is given in spherical coordinates ($\phi$, $\lambda$) then the cosine of the distance to an LEP point with parameter value s is $$\cos\mu = \cos\lambda\cos\phi\left(\frac{-r^2 + 2rs\sin\theta - s^2\sec^2\alpha + 1}{2r} - s\sin\theta + r\right) - \quad (10)$$

$$\tan\alpha\sin\lambda\cos\phi\sqrt{1 - \frac{\cot^2\alpha\sec^2\theta(-r^2 + 2rs\sin\theta - s^2\sec^2\alpha + 1)^2}{4r^2s^2}} + $$

$$s\sin\phi\left(\cos\theta + \frac{\tan\theta(-r^2 + 2rs\sin\theta - s^2\sec^2\alpha + 1)}{2rs}\right).$$

In some embodiments, the distance from a point to the closest point on the LEP is calculated as follows. The distance from a point ($\phi$, $\lambda$) to an LEP is defined $$\min_s \mu(s), \; s \in (0, \infty), \quad (11)$$

where $\mu(s)$ was defined in Equation (10). In practice the half-infinite interval is restricted to the valid parameter interval described above. The derivative of $\mu(s)$ can be computed, so solving the problem posed by Equation (11) can be solved by finding the zeros of the derivative. The zero of the derivative is computed numerically. For example, Brent's zero( ) algorithm is a known and effective zero finding method that can be used here.

Thus far we have described the LEP function in a simple form assuming a cone at a fixed location latitude/-longitude (0°,0°) and altitude r, the earth modeled as a unit sphere, and the cone axis directed due north. Only the pitch and cone angle were allowed to change.

In general the cone apex can be at any latitude/longitude and altitude, its axis can be any angle relative to north, and the input is in standardized units such as meters, feet or miles. Let latitude and longitude be $\phi$ and $\lambda$, heading and pitch are $\psi$ and $\theta$, cone angle is $\alpha$, normalized altitude r (normalized altitude is aircraft altitude if earth radius is 1). All angles are in radians.

To simplify writing out results, let $$\omega = \sqrt{\begin{array}{c} 2r^2(\sec^2\alpha - 3)\cos(2\theta) + (8 - 6r^2)\sec^2\alpha - \\ 2r^2(4\tan\alpha\sin(2\theta)\sin(u) + 2\tan^2\alpha\cos^2\theta\cos(2u) - 1) \end{array}}$$

$$\epsilon = \sqrt{\frac{-4\tan\alpha(\cos 2u\tan\alpha\cos^2\theta + 2\sin u\sin\theta)r^2 - }{(r^2\cos 2\theta + \cos 2\alpha(3\cos 2\theta - 1)r^2 + 5r^2 - 8)\sec^2\alpha)}}.$$

$$\zeta = \sqrt{\begin{array}{c} -\sec^2\alpha(r^2\cos 2\alpha(3\cos 2\theta - 1) + r^2\cos 2\theta + 5r^2 - 8) - \\ 4r^2\tan\alpha(\tan\alpha\cos^2\theta\cos 2u + 2\sin 2\theta\sin u) \end{array}}$$

and $$\eta = (\sqrt{2}\,\zeta + 4r\sin\theta - 4r\tan\alpha\tan\theta\sin u).$$

The LEP in Cartesian coordinates, parameterized in u, is then:

$$x(u)=\cos^2\alpha(r\sec^2\alpha\cos\lambda\cos\phi-\tfrac{1}{4}(\sqrt{2}\zeta+4r\sin\theta-4r\tan\alpha\tan\theta\sin u)(\sin\lambda(\tan\theta\sin\psi+\tan\alpha(\sin\theta\sin u\sin\psi-\cos u\cos\psi))+\cos\lambda(\sin\phi(\tan\theta\cos\psi+\tan\alpha\sin\theta\sin u\cos\psi+\tan\alpha\cos u\sin\psi)+\cos\phi(\sin\theta-\tan\alpha\tan\theta\sin u))))$$

$$y(u)=\cos^2\alpha(\tfrac{1}{4}\eta(\tan\theta\cos\lambda\sin\psi-\sin\lambda(\tan\theta\cos\psi\sin\phi+\sin\theta\cos\phi))+\tan\alpha(\sin u(\sin\theta(\cos\lambda\sin\psi-\sin\lambda\cos\psi\sin\phi)+\tan\theta\sin\lambda\cos\phi)-\cos u(\cos\lambda\cos\psi+\sin\lambda\sin\psi\sin\phi)))+r\sec_2\alpha\sin\lambda\cos\phi)$$

$$z(u)=\cos^2\alpha(\tfrac{1}{4}\eta(\tan\theta\cos\psi\cos\phi-\sin\theta\sin\phi+\tan\alpha(\cos\phi(\sin\theta\sin u\cos\psi+\cos u\sin\psi)+\tan\theta\sin u\sin\phi))+r\sec^2\alpha\sin\phi)$$

This is the expression used in practice, since it gives the LEP for any aircraft location, attitude and cone angle (AOA). Equation (7) is a simplified form of this expression restricted to the cases where latitude/longitude is (0°,0°) and heading is due north.

Figure 7:
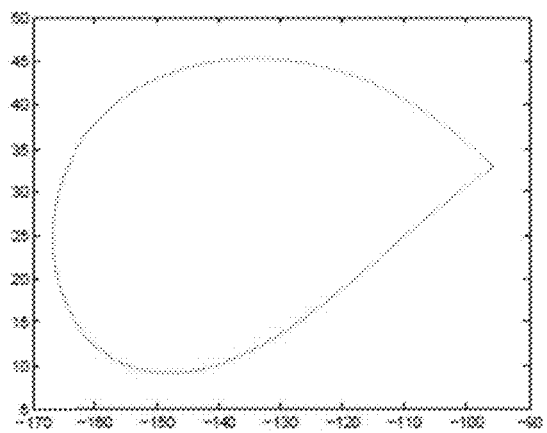
FIG. 7 is an exemplary illustration of a typical LEP showing the two computational pieces, LEP 1 and LEP 2, according to some embodiments of the present invention.

FIG. 7 is an exemplary illustration of a typical LEP showing the two computational pieces, LEP 1 and LEP 2, according to some embodiments of the present invention. The LEP is plotted with longitude-latitude axes. Since the LEP lies on the surface of the earth it is actually a curve in three-dimensions.

In some embodiments, digital elevation data is used for the fix computation. When using digital elevation data, the posited emitter location is also associated with an accurate elevation, which is fed into the LEP derivation process. Digital elevation data can also be used to ensure there is line of sight to a posited fix. Digital elevation data may have many formats. A common format is a rectangular grid of measurement points, each associated with an elevation (vertical displacement) relative to an ellipsoidal earth model. The grid can be treated as a surface of triangular facets. The digital LEP process can be constructed that intersects the LEP cone with these triangular facets. While the base calculation is simpler than intersecting with a sphere or ellipsoid, it needs to be performed many thousands of times, depending on the resolution of the measurements.

The enclosed Appendix A describes more detail and further mathematical proof for various derivations, the entire contents of which is hereby expressly incorporated by reference.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method performed by one or more processors for determining geo-position of a target by an aircraft, the method comprising:
   receiving navigation data related to the aircraft including aircraft attitude information;
   receiving multilateration information related to the target including an angle to the target;
   calculating an axis for a cone fixed to the aircraft, based on the received aircraft attitude information;
   calculating a central angle for the cone from the received angle to the target;
   generating two vectors orthogonal to the cone axis;
   calculating a cone model from the axis, the central angle and the two vectors;
   intersecting the cone model with an earth model to obtain a locus of emitter positions (LEP) curve, wherein the LEP curve is used to determine the geo-position of the target; and
   transmitting the established position of the target to a navigation system.

2. The method of claim 1, further comprising:
   repeating the method of claim 1 to obtain a plurality of LEP curves;
   accumulating, in a computer storage medium, the plurality of LEP curves; and
   determining a position that is closest to all the accumulated LEP curves to establish a position of the target.

3. The method of claim 1, wherein the model of the earth is digital elevation data.

4. The method of claim 3, wherein the digital elevation data is a rectangular grid of measurement points, each associated with an elevation relative to an ellipsoidal earth model.

5. The method of claim 1, wherein the model of the earth is a sphere.

6. The method of claim 1, wherein the navigation data includes position, heading, pitch and roll data.

7. A system for determining geo-position of a target by an aircraft comprising:
   a receiver for receiving navigation data related to the aircraft and multilateration information related to the target, wherein the navigation data includes aircraft attitude information and the multilateration information includes an angle to the target;
   one or more processors for calculating an axis for a cone fixed to the aircraft, based on the received aircraft attitude information, calculating a central angle for the cone from the received angle to the target, generating two vectors orthogonal to the cone axis, calculating a cone model from the axis, the central angle and the two vectors, and intersecting the cone model with an earth model to obtain a locus of emitter positions (LEP) curve, wherein the LEP curve is used to determine the geo-position of the target; and
   a transmitter for transmitting the established position of the target to a navigation system.

8. The system of claim 7, wherein said one or more processors are further configured to:
   repeat receiving navigation data, calculating the axis and the central angle, generating the two vectors, and intersecting the cone model with an earth model to obtain a plurality of LEP curves;
   accumulate, in a computer storage medium, the plurality of LEP curves; and
   determine a position that is closest to all of the accumulated LEP curves to establish a position of the target.

9. The system of claim 8, wherein the digital elevation data is a rectangular grid of measurement points, each associated with an elevation relative to an ellipsoidal earth model.

10. The system of claim 7, wherein the model of the earth is digital elevation data.

11. The system of claim 7, wherein the model of the earth is a sphere.

12. The system of claim 7, wherein the navigation data includes position, heading, pitch and roll data.

* * * * *